Figure 1:
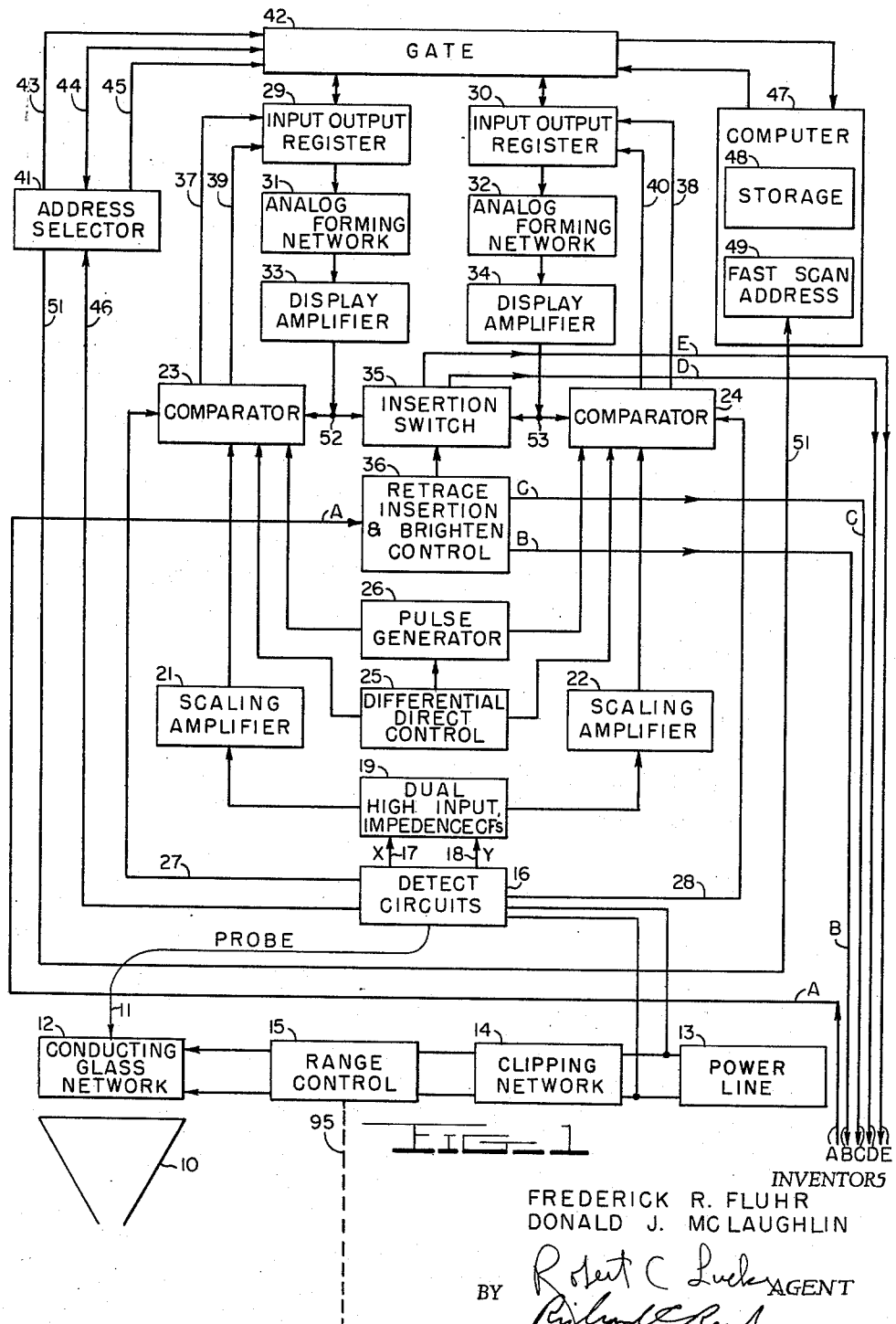

INVENTORS
FREDERICK R. FLUHR
DONALD J. MCLAUGHLIN

BY Robert C. Lucke AGENT
Richard C. Reed ATTORNEY

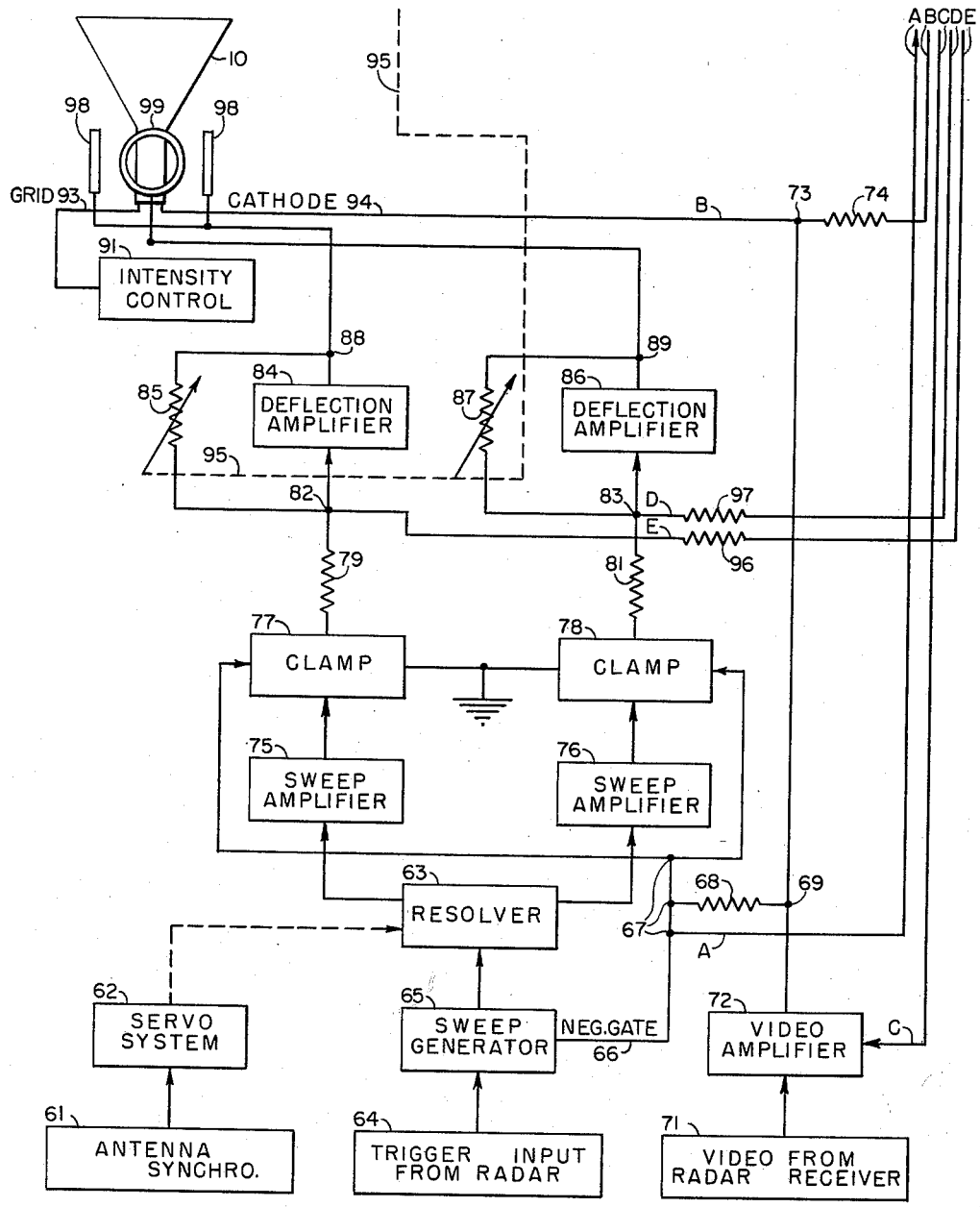

United States Patent Office 3,102,926
Patented Sept. 3, 1963

3,102,926
DIGITALIZED PICKOFF DISPLAY CONVERTER
Frederick R. Fluhr, 7234 Fort Foote Terrace, Fort Foote, Md., and Donald J. McLaughlin, 3730 Camden St. SE., Washington, D.C.
Filed June 30, 1960, Ser. No. 40,122
3 Claims. (Cl. 178—18)
(Granted under Title 35, U.S. Code (1952), sec. 266)

The invention described herein may be manufactured and used by or for the Government of the United States of America for governmental purposes without the payment of any royalties thereon or therefor.

This invention relates to pickoff display converters and more particularly to pickoff display converters to provide digitalized outputs representative of the coordinate values on selected locations of a conductive glass overlay for a signal display.

In a system which includes a signal display means, such as an oscilloscope, a radar or a sonar display, a conductive glass resistance network which is placed to overlie the display means, a probe which is used to contact the conductive glass resistance network and thereby provide a marker on the display, control means to selectively distribute the outputs of the probe to a computer and to the signal display means during the retrace time thereof, it is desired that the signal inputs and outputs of the computer be in digital form. This invention is directed to a digitalized pickoff display converter.

There has long been a need in the art for a means for tracking one of a plurality of signals appearing on a signal display means. The digitalized pickoff display converter of this invention provides such tracking whereas the coordinates of a signal which is selected by the probe in contact with the conductive glass overlay is fed into the display means to provide a secondary signal, which can be brighter or pulsing, for example, during the retrace, or dead time, of the display means so that the selected signal is marked thereby. A stored program in the computer will control the marker as soon as enough tracking information has been provided by the probe to permit the computer to move the marker along the path of the signal being marked. Provision is made so that the probe need not be placed in exact alignment with the selected signal, but that the marker will respond to the probe differentially.

An object of this invention is the provision of all of the above said advantages in a tracking system which includes a digital computer.

Other objects and advantages of the invention will hereinafter become more fully apparent from the following description of the annexed drawings, in which FIG. 1 shows in block diagram a preferred embodiment of this invention.

FIG. 2 shows in block diagram the connections and relationship of the circuit of this invention with a typical radar display device.

Briefly, this invention is directed to a tracking system which includes a radar type display with a conductive glass overlay thereon, a probe is placed in contact with the conductive glass overlay to provide coordinate voltage representation of the point of contact of the probe, such point of contact could coincide with a signal on the radar display to render the probe coordinates representative of the signal coordinates. The probe is connected through control means to a digital computer and to the radar display where a marker signal is produced during the retrace time of the radar display to indicate which of the signals on the radar display has been selected to be tracked. The computer will provide a probable path of movement of the radar signal once the probe has provided enough information for such activity and the probe has been removed from the conducting glass. When a second signal is to be traced, the probe is placed on or a relative distance from a second signal so that the marker controlled by the probe is placed on such second signal and a second address in the computer is connected so that such second signal will be tracked.

Referring now to the drawings, there is shown in FIG. 1 a probe 11 which is shown in contact with the resistance network conductive glass 12 which overlies a signal display means 10. The conducting glass network 12 is energized from a power source 13 which is fed to a clipping network 14 which provides square alternating voltage signals for X and Y coordinate representation in time, the output thereof being applied to range control 15. The output of the range control 15 is connected to the conducting glass network 12.

Probe 11 is connected to detection circuits 16 which respond to the X and Y coordinate separation in time and provide only X information at the X output 17 and only Y information at the Y output 18. These outputs are applied to separate channels in a dual high input impedance cathode follower 19, the outputs of which are applied to X scaling amplifier 21 and Y scaling amplifier 22, respectively. The outputs of the X and Y scaling amplifiers are applied to X coordinate comparator 23 and Y coordinate comparator 24, respectively. Also connected to the comparators are differential-direct control circuit 25 and a pulse generator 26, control circuit 25 and generator 26 being connected to each other. Further X and Y inhibiting signals to indicate when the probe is not in contact with the conducting glass are applied from the detection circuits 16 to the respective comparators 23 and 24 by leads 27 and 28. The outputs of the comparator 23 are the up-down-stop control 37 and the pulse line 39 connected to the input-output register 29 and the outputs of the comparator 24 are the up-down-stop control 38 and the pulse line 40 connected to the input-output register 30.

One output of the input-output register 29 is connected to the analog forming network 31, the output of which is connected to display amplifier 33. The output of display amplifier 33 is connected to junction 52 to which are also connected the comparator 23 and the insertion switch 35.

One output of the input-output register 30 is connected to the analog forming network 32, the output of which is connected to display amplifier 34. The output of the display amplifier 34 is connected to a junction 53 to which are also connected insertion switch 35 and comparator 24. Also connected to the insertion switch 35 is retrace insertion and brighten control 36.

Also connected to the input-output registers 29 and 30 is the gate 42. An address selector 41 is provided with connection 43 to close gate 42 after proper store passes when probe 11 is in contact with the conducting glass 12. A second connection 44 is provided between the address selector 41 and gate 42 which provides position selection and a third connection 45 is provided therebetween to open gate 42 and transfer to the storage section 48 of computer 47 when the selected store passes after the probe 11 is lifted from network 12. The address selector 41 is provided with an input signal from detector circuits 16 through connector 46 which indicates the probe sense of conducting glass contact. Also, the address selector 41 is provided with a connection 51 with the fast scan address 49 in the computer 47.

The above listed structure provides the necessary hardware to provide the digitalized pickoff display conversion when connected with a display device as shown in FIG. 2. The connecting means between the converter and the display device are labelled A, B, C, D and E. In a typical signal display device, such as is shown in FIG. 2, an antenna synchronizer 61 connected to a servo system 62 which is mechanically coupled to a resolver 63. A trigger input from a radar transmitter 64 is applied through sweep generator 65 to the resolver 63. Also derived from the sweep generator 65 is a negative gate signal 66 which is applied through junction 67 to clamps 77 and 78 and also through connector A to the retrace insertion and brighten control 36 in FIG. 1. A video signal from a radar receiver 71 is applied to video amplifier 72 to which is also applied the retrace insertion signal output of the retrace insertion and brighten control 36 in FIG. 1 and carried by conductor C. The output of the video amplifier 72 is applied across junction 69, which is separated from junction 67 by a resistance means 68, and a junction 73 to the cathode 94 of the cathode ray tube 10. The brighten signal from the retrace insertion and brighten control 36 in FIG. 1 is applied through conductor B and resistance means 74 to junction 73 and on to the cathode of the cathode ray tube 10.

The X and Y component outputs of the resolver 63 are applied to sweep amplifiers 75 and 76, respectively. The output of amplifier 75 is applied to clamp 77 and the output of amplifier 76 is applied to clamp 78, clamps 77 and 78 being connected to a common return. The output of clamp 77 is applied across resistance means 79 to a junction 82 to which are also connected the range control 85 and deflection amplifier 84 for the X coordinates whereas clamp 78 is connected across resistance means 81 to junction 83 to which are also connected range control 87 and deflection amplifier 86 for the Y coordinates. Range controls 85 and 87 are mechanically coupled to range control 15 in FIG. 1 so that the range of operation for the deflection of the marker will always be the same as the range of operation of the probe 11. The range control 85 and the deflection amplifier are connected at junctions 82 and 88, in the manner of an operational amplifier, and connected in like manner are range control 87 and deflection amplifier 86, at junctions 83 and 89. The outputs of such operational amplifiers are applied to the respective deflection means 98 and 99, which can be deflection plates or coils aligned perpendicularly, for the cathode ray tube 10.

An intensity control means 91 is connected to the grid 93 of the cathode ray tube 10 whereas the video amplifier 72 is connected to the cathode 94 of the cathode ray tube 10 through junctions 69 and 73.

The connections between the digitalized pickoff display converter shown in FIG. 1 and the cathode ray display device shown in FIG. 2 are as follows: Connection A is a means whereby the negative gate 66 which is generated by the sweep generator 65 is applied through junction 67 to the retrace insertion and brighten control 36 in FIG. 1. Connection B provides the brighten signal from the retrace insertion and brighten control 36 across resistance means 74 and junction 73 to the cathode 94 of the cathode ray tube 10. Connection C carries the retrace insertion signal from the retrace insertion and brighten control 36 to the video amplifier 72. Connections D and E carry the Y and X coordinate value signals from the insertion switch 35 across resistance means 97 and 96, respectively, to junctions 83 and 82, respectively.

In the operation of the system of this invention, the probe 11 is placed in contact with the conducting glass 12 and can be made to move a marker which appears on the face of the cathode ray tube there below in a direct one-to-one relationship, called the direct probe marker control, or in a vernier relationship, called the vernier-differential probe marker control. Selection of operating probe marker control is provided by the differential direct control means 25 which could be a switching means. In either the direct or the differential probe marker control, it is possible to select one of three types of tracking. These are: normal, or straight, tracking wherein one marker is associated with one target; fast scan tracking wherein all of the stored markers are displayed simultaneously, one of such markers is manually selected at a time while all of the markers are visible; and hooking tracking wherein the fast scan display is operative and one of the markers is manually selected by the operator. The normal and fast scan tracking differ from the hooking tracking in the manner in which the computer is utilized. In normal and fast scan tracking, there is access to and control of the storage section of the computer wherein selection of a target to be tracked is determined by the operation of one of a plurality of switches in the address selector 41 to select an address by address voltage and to present the contents of such address to the display means. Upon removal of the probe from the conducting glass, the computer is modified by the coordinate values last sensed by the probe. In the hooking tracking, there is no access to the computer for changing or modifying a store. The searching for the store of a chosen marker during hooking tracking is accomplished by the actual coordinate voltages being stored as opposed to the address voltages in the normal and fast scan tracking.

The digital computer 47 includes a storage section 48 in which a plurality of addresses include stored marker coordinates in digital form of a usually equal plurality of target locations. It is not necessary, however, that all of the addresses be utilized. The address selector 41 presents a plurality of choices to the operator whereby he can select anyone of the address locations in the computer in which to store new coordinate information as well as readout the stored information therefrom and present such information on the face of the cathode ray tube 10. The computer also includes a fast scan address 49 which provides a very rapid presentation of some or all of the stored target positions on the cathode ray tube 10. This is accomplished by the sequential feeding of the input-output registers 29 and 30 with the coordinate positions of each of the stores at the radar pulse rate frequency or at some other convenient clock rate. The fast scan operation is more fully disclosed in Naval Research Laboratory Report 5254, Office of Technical Service PB No. 136512 entitled "Fast Scan: A 36-Position Multiple-Channel Electronic Switch," by Frederick R. Fluhr.

Upon the selection of a particular computer address by operating a switch in the address selector 41, the corresponding marker appearing on the plan position indicator, hereinafter called the PPI, is accentuated either by increased intensification or by modulation. This accentuation is accomplished by the retrace insertion and brighten control 36 which not only provides a pulse of proper polarity to operate the insertion switch 35 to feed the coordinate values to the deflection amplifiers 84 and 86 and, thus, to the respective deflection means 98 and 99 to position the marker, but provides a signal to the video amplifier 72 which allows the marker signal to be placed on the PPI during the retrace time of the regular PPI signal, and also provides an accentuating brighten signal which is fed to the cathode 94 of the cathode ray tube 10.

When the probe is placed on the conducting glass overlay, the proper store is selected in the address selector 41 by address comparison when it becomes available in the fast scan sequence. After the proper store in the fast scan sequence is passed by gate 42 to the respective input-output registers 29 and 30, the address selector, having sensed that the proper store has passed, provides a signal through conductor 43 to close gate 42. With the information that the computer had previously used to position the marker now in the registers, the positioning operation is accomplished by moving the probe on the conducting glass.

To an alternating current power source 13 is connected a slipping network 14 which provides a square wave output in which one constant voltage level is designated X and the other level is designated Y. The square wave is fed to a range control 15 which provides the relationship of the incremental unit of measurement on the conducting glass 12 and the actual distance to the target displayed on the cathode ray tube 10. The conducting glass network provides equipotential lines which are representative of X and Y coordinates, the X and Y directions of equipotential lines being alternately energized under the control of the square wave from squaring network 14. The position of the probe on the conducting glass is readily determined by the potential of the alternating X and Y coordinate voltage levels and such levels are determined by the specific equipotential lines that the probe contacts.

The voltage levels supplied by the probe are fed to detector circuits 16, which by discrete connections to the power source 13, are synchronized with the squaring network 14 so that the detector circuits will provide separated X and Y signals of analog coordinate values to the two channels of the dual high input impedance cathode followers 19. The detector circuits 16 will also provide a signal to the address selector 41 through conductor 46. This signal reveals that the probe is in contact with the conducting glass and the address selector will respond by causing gate 42 to be closed after the selected store is passed to the registers. Connector 43 is used to symbolize such operation. Further, the detector circuits 16 provide a signal through connectors 27 and 28 to the respective comparators 23 and 24 in response to the removal of the probe from the conductive glass so that the comparators will be inhibited from comparing when the probe is not on the conducting glass. This removes any chance that the markers will be moved by any extraneous signal that the probe might introduce during the time that the probe is off the conducting glass.

Since there are several methods of probe marker control in the operation of this system, such as the direct probe marker control and the differential probe marker control which will be more fully discussed later in this specification, it is desirable that a means be provided whereby selection of the probe marker control operation can be accomplished. This is done by the differential-direct control 25 which is a simple switch which, when in the differential position provides an inhibiting signal to the pulse generator 26 and signals to the comparators which cause the comparators to produce pulsed digital outputs which are sent to the input-output registers. These digital signals are supplied to the registers through conductors 37 and 38 for the respective coordinates, which provide to the registers the up, down and stop control. Since the gate 42 is closed in response to the placement of the probe on the conducting glass, the digital computer is not informed of the changes that occur in the registers until the gate is opened upon the removal of the probe from the conducting glass. In its operation, the address selector 41 keeps gate 42 open while the probe is not on the conducting glass.

In the fast scan operation, placement of the probe on the conducting glass causes the coordinates available in the addresses of the storage section 48 of computer 47 to be compared with the coordinates of the selected marker and, upon the passing of the proper address in the store, the gate allows the selected store to be passed into the registers and then the gate is closed. The computer provides its stored information when the probe is placed on the conducting glass and is excluded from the circuitry until the probe is removed. When the probe is removed, the address selector controls the gate such that the correct store is connected to the registers whereupon the information in the registers is then dumped into the storage 48 of the computer. A program in the computer then is modified by the newly stored information and marker control is once more under the control of the computer. After the transfer is completed, the gate remains open and the fast scan operation is resumed.

To continue the operation with the probe still in contact with the glass in the fast scan operation, the registers provide a digital output to the analog forming networks 31 and 32, respectively, where the digitalized signals are converted into analog voltage levels that will properly position the marker on the cathode ray tube. These voltage levels are properly amplified by display amplifiers 33 and 34 and are fed to junctions 52 and 53, respectively. Comparator 23 then operates to compare the voltage level of the output of the scaling amplifier 21 and the voltage level at junction 52. In response to such comparison, an up-down-stop output control signal is applied through connector 37 to the input-output register and the comparator 23 generates a pulse going to register 29 through connector 39 for each unit distance that probe 11 is moved on the conducting glass 12. This pulse formed by comparator 23 causes the input-output register to operate one step for each pulse, which in turn causes the feedback voltage to the comparator to be changed in the proper sense such that balance is again achieved. This forms a closed loop. So it is seen that the voltage level at junction 52 follows the voltage level of the equipotential lines on the conducting glass which are contacted by the probe. The operation of comparator 24 is identical with the operation of comparator 23.

The analog voltage levels at junctions 52 and 53, being representative of the respective X and Y coordinate values of the probe position on the conducting glass, are available as inputs to the insertion switch 35. The retrace insertion and brighten control 36, in response to the negative gate 66 from the sweep generator 65 in the display device of FIG. 2 which is connected by connector A, provides a signal to the insertion switch 35 which during the normal trace that places the regular display signal on the cathode ray tube 10, clamps the voltage coordinate representations therein to ground. During the retrace time of the regular display signal, the retrace insertion and brighten control 36 provides a signal to the insertion switch 35 which permits the voltage coordinate representation at junctions 52 and 53 to be transferred through the respective conductors D and E through respective matching impedance means 97 and 96 to the respective deflection amplifiers 86 and 84. The deflection amplifiers 86 and 84 present to the deflection means 99 and 98, respectively, the trace of the regular display signal and, during the retrace time thereof, the trace of the marker signal.

Since the marker is most readily accentuated to be easily noticeable by being brightened more than the regular signals on the cathode ray tube or by being pulsed to blink at a 3-to-5 cycles per second rate, the retrace insertion and brighten control 36 provides such accentuation through connectors B and C to junction 73. Connector B carries the brighten control signal whereas connector C provides the video signal to the video amplifier 72 of the display means.

To conclude the fast scan operation, the positioning operation is accomplished by moving the probe on the conducting glass. When the probe is lifted, the coordinate positions are held in the registers 29 and 30 until the address selector 41 indicates that the proper store is present. The gate 42 is then allowed to open and to transfer the contents of the registers 29 and 30 into the store 48. After the transfer is completed, the gate 42 remains open and the fast scan operation is resumed.

When not in the fast scan operation, the operator merely selects the target location at the address selector. This causes the selected store coordinates to be gated through to the input-output registers and holds the gate closed after the transfer from the store. By placing the probe 11 on the conducting glass 12, the operator acquires control of the inserted marker. The probe position (direct mode) is encoded in the registers 29 and 30 by the comparators 23 and 24, digital-to-analog-forming networks 31 and 32, and display amplifiers 33 and 34. When the marker is properly positioned, its coordinate values are present in the input-output registers 29 and 30. On lifting the probe 11, the comparators 23 and 24 are inhibited so that the registers 29 and 30 will not change, and the gate 42 is opened so that the marker coordinates are transferred to the store 48.

When the operator wishes to obtain a computer address, or store, by position comparison (hooking), he sets the address selector 41 to the hook condition. Sequence slots in the fast scan 49 are made available for the operator's marker during the hook operation; thus the fast scan presentation remains present on the PPI. Placing the probe 11 on the glass 12 and positioning the controlled marker over the target marker to be acquired causes the registers 29 and 30 to come to the same values as one of those being presented to the gate 42 sequentially. When the store with the same coordinates as in the registers is present at the gate, the store number is indicated at the address selector 41, and the coincident markers on the PPI either blink at a 3-to-5 c.p.s. rate or become brighter in order to indicate that the coincidence has taken place. Lifting of the probe will cause no change. Placing the probe on the glass and moving the marker away from the hooked marker will stop the blinking (or eliminate the extra intensification). No changes will be made in the store during any of these operations unless the operator activates a repositioning mode. Normal operation is resumed when the operator changes the address selector from the hooked setting.

In the direct mode of operation, the inserted marker immediately moves to the vicinity of the probe position when the probe 11 is placed on the conducting glass 12. Moving the probe on the glass causes the displayed PPI marker to follow in a 1:1 fashion. Assuming the fast scan display, the gate 42 is open and all selected tracks are being sequentially inserted into the input-output registers 29 and 30. The register values are converted to analog voltages by the analog-forming networks 31 and 32 and are presented to the PPI through the display amplifiers 33 and 34 and insertion switch 35. The operator may select the store on which he wishes to take action by use of the address selector 41. Placing the probe on the conducting glass causes the detect circuit 16 to close the gate 42 after the selected store coordinates are inserted into the registers 29 and 30 and to release the inhibit on the comparators 23 and 24. Upon release of the comparators, the registers are made to count up or down by directed pulses from the pulse generator 26 through the comparators. When the corresponding outputs of the display amplifiers 33 and 34 and the scaling amplifiers 21 and 22 are equal, the comparators 23 and 24 stop the counting. If all the circuits are aligned, the inserted marker will appear under the probe. Moving the probe on the glass upsets the comparators (when the motion is greater than the smallest corresponding voltage increment) and causes the registers to count in the direction necessary to have the marker motion follow the probe motion. When the marker is properly positioned, the encoded coordinates are present in the X and Y input-output registers. Upon lifting the probe from the conducting glass, the comparators are immediately inhibited so that the registers cannot change. The probe signal also allows the address selector to open the gate when the proper store appears at the gate. The contents of the registers are then transferred to the store. After the transfer is completed, the normal fast scan presentation is resumed.

In the differential mode of operation, the inserted marker does not move when the probe is placed in contact with the conducting glass, but it does follow the motion of the probe when the probe is moved on the conducting glass. In this mode of operation, a vernier action can be incorporated; that is, the marker will move only a fraction of the distance the probe is moved on the conducting glass. The differential-direct control is set to differential, which causes the pulse generator to be turned off. The differential-direct control also modifies the operation of the comparators so that they produce a single output pulse for each incremental distance the probe is moved. The comparators still produce the proper count directions for the registers.

As before, the operator (using the fast scan display) selects, with the address selector, the store he wishes to correct. Placing the probe on the conducting glass causes the detect circuit, operating through the address selector, to close the gate after the proper store has been put into the input-output registers. The PPI display will show the marker whose coordinates are in the registers. When the operator slides the probe on the conducting glass in the desired direction, the comparators cause X and/or Y pulses to be added and/or subtracted in the respective registers for each corresponding incremental change made in the signals from the scaling amplifiers. The factor placed on the value of the incremental change by the scaling amplifiers determines the degree of vernier action. When the probe is lifted from the conducting glass, the comparators are inhibited and the contents of the registers are transferred to the store through the gate when the proper store appears. Upon completion of the transfer, the fast scan display is resumed.

A method of communicating with digitalized Naval Data Handling System machines for purposes of monitoring and correcting is hereby disclosed. The digitalized Pickoff Display Converter provides the analog-to-digital and digital-to-analog conversions necessary in the types of PPI displays which will be used in the data-handling systems. Direct and differential modes of operation of the probe-controlled marker would be provided, and the PDC would be capable of working with a fast scan type of display.

Obviously many modifications and variations of the present invention are possible in the light of the above teachings. It is therefore to be understood that within the scope of the appended claims the invention may be practical otherwise than as specifically described.

What is claimed is:
1. In a pick-off display converter,
a signal display means,
a conductive glass resistance network which overlies said display means,
a probe for contacting the conductive glass resistance network at a selectable point thereon,
forming means for deriving an analog signal representative of the position of contact,
comparator means connected to said forming means and to the probe for comparing the analog signal and the signals derived by the probe and correcting the forming means to minimize differences in compared signals,
and means for producing an indication on said display means in accordance with the analog signal.
2. In a digitalized pick-off display converter,
a signal display means,
a conductive glass resistance network which overlies said display means,
a probe for contacting the conductive glass resistance network at a selectable point thereon,
forming means for deriving an analog signal representative of the position of contact,
comparator means connected to said forming means and to the probe for comparing the analog signal and the signals derived by the probe and correcting the forming means to minimize differences in compared signals,
means for converting the analog signal into a digitalized signal,
a computer connected to said means for converting and to the signal display means for deriving the probable path of movement of the signal being displayed as identified by the probe,
means for producing a secondary indication on said display means in accordance with the computer output,
and means for controlling the forming means from the computer output when the secondary indication at- tains a selected relationship to the point of contact of the probe on the conductive glass resistance network.

3. In a digitalized pickoff display converter comprising, a signal display means, a conductive glass resistance network which overlies said display means, a probe which is used to contact said resistance network to provide an analog output representation of the position of contact, comparator means connected to said probe analog output to effect a digital quantization of said analog representation, detector means connected to said comparator means and providing dimensionally separate coordinate values, a digital computer for receiving information from said comparator means, control means to selectively distribute the analog outputs of the probe to said comparator means, to said computer and to the display means during the retrace time thereof, said control means including a differential probe marker control and a direct probe marker control.

References Cited in the file of this patent

UNITED STATES PATENTS

| 2,498,649 | Clark | Feb. 28, 1950 |
| 2,704,305 | McLaughlin et al. | Mar. 15, 1955 |
| 2,817,831 | Johnson | Dec. 24, 1957 |
| 2,849,707 | White | Aug. 26, 1958 |
| 2,891,244 | Pastoriza | June 16, 1959 |
| 2,900,446 | McLaughlin et al. | Aug. 18, 1959 |
| 2,917,737 | Close | Dec. 15, 1959 |
| 3,032,609 | Fluhr | May 1, 1962 |

OTHER REFERENCES

"Volscan Unsnarls Airport Traffic Jam," Aviation Week; vol. 59, Dec. 28, 1953, pp. 38–43.